(12) United States Patent
Muttik et al.

(10) Patent No.: US 6,963,978 B1
(45) Date of Patent: Nov. 8, 2005

(54) DISTRIBUTED SYSTEM AND METHOD FOR CONDUCTING A COMPREHENSIVE SEARCH FOR MALICIOUS CODE IN SOFTWARE

(75) Inventors: Igor G. Muttik, Berkhamsted (GB); Neil A. Cowie, Aylesbury (GB); Ivan A. Teblyashkin, Aylesbury (GB)

(73) Assignee: McAfee, Inc., Santa Clara, CA (US)

( * ) Notice: Subject to any disclaimer, the term of this patent is extended or adjusted under 35 U.S.C. 154(b) by 868 days.

(21) Appl. No.: 09/916,981

(22) Filed: Jul. 26, 2001

(51) Int. Cl.$^7$ ............................................. G06F 11/07
(52) U.S. Cl. ....................................................... 713/188
(58) Field of Search ............................... 713/188, 187, 713/200, 201

(56) References Cited

U.S. PATENT DOCUMENTS

| | | | |
|---|---|---|---|
| 5,349,655 A | | 9/1994 | Mann .......................... 395/575 |
| 5,613,002 A | * | 3/1997 | Kephart et al. ............... 713/200 |
| 5,684,875 A | | 11/1997 | Ellenberger ..................... 380/4 |
| 6,035,423 A | * | 3/2000 | Hodges et al. ................. 714/38 |
| 6,338,141 B1 | * | 1/2002 | Wells .......................... 713/200 |
| 6,577,920 B1 | * | 6/2003 | Hypponen et al. ............. 700/200 |
| 2001/0005889 A1 | * | 6/2001 | Albrecht ...................... 713/201 |
| 2002/0116542 A1 | * | 8/2002 | Tarbotton et al. ............. 709/318 |

OTHER PUBLICATIONS

Vibert, R., "A Day in the Life of an Anti-Virus Lab", Jun. 17, 2000, pp. 1-5, obtained from http://www.security-focus.com/infocus/1268.*

* cited by examiner

*Primary Examiner*—Andrew Caldwell
*Assistant Examiner*—Jeffrey Popham
(74) *Attorney, Agent, or Firm*—Zilka-Kotab, PC; Christopher J. Hamaty

(57) ABSTRACT

A system, method and computer program product are provided for detecting viruses in software. Initially, data is compared with a plurality of virus definitions in a first database. If the data is successfully compared with at least one of the virus definitions, a security event is executed. The data is then compared with fingerprints of innocent data in a second database. If the data is successfully compared to the fingerprints of innocent data, access to the data is permitted. If, however, the data is unsuccessfully compared to the virus definitions and the fingerprints of innocent data, information is transmitted over a network for analysis purposes.

23 Claims, 7 Drawing Sheets

DISTRIBUTED SYSTEM AND METHOD FOR CONDUCTING A COMPREHENSIVE SEARCH FOR MALICIOUS CODE IN SOFTWARE

FIELD OF THE INVENTION

The present invention relates to virus scanning methods, and more particularly to scanning data for viruses.

BACKGROUND OF THE INVENTION

Network security management is becoming a more difficult problem as networks grow in size and become a more integral part of organizational operations. Attacks on networks are growing both due to the intellectual challenge such attacks represent for hackers and due to the increasing payoff for the serious attacker. Furthermore, the attacks are growing beyond the current capability of security management tools to identify and quickly respond to those attacks. As various attack methods are tried and ultimately repulsed, the attackers will attempt new approaches with more subtle attack features. Thus, maintaining network security is on-going, ever changing, and an increasingly complex problem.

Computer network attacks can take many forms and any one attack may include many security events of different types. Security events are anomalous network conditions each of which may cause an anti-security effect to a computer network. Security events include stealing confidential or private information; producing network damage through mechanisms such as viruses, worms, or Trojan horses; overwhelming the network's capability in order to cause denial of service, and so forth.

Security systems often employ security risk-assessment tools, i.e. "scanners," to simulate an attack against computer systems via a remote connection. Such scanners can probe for network weaknesses by simulating certain types of security events that make up an attack. Such tools can also test user passwords for suitability and security. Moreover, scanners can search for known types of security events in the form of malicious programs such as viruses, worms, and Trojan horses. Further, scanners are used for content filtering to enforce an organization's operational policies [i.e. detecting harassing or pornographic content, junk e-mails, misinformation (virus hoaxes), etc.].

Unfortunately, scanners are incapable of providing a definitive answer whether software is malicious or not. Just because software passes a scan test, malicious code may still exist for various reasons. For example, the scanner may not have been recently updated with the latest known viruses. For these and other reasons, there is a need for a technique of assuring the quality of scanning by ascertaining whether software is innocent or viral with more certainty.

DISCLOSURE OF THE INVENTION

A system, method and computer program product are provided for detecting viruses in software. Initially, data is compared with a plurality of virus definitions in a first database. If the data is successfully compared with at least one of the virus definitions, a security event is executed. The data is then compared with fingerprints of innocent data in a second database. If the data is successfully compared to the fingerprints of innocent data, access to the data is permitted. If, however, the data is unsuccessfully compared to the virus definitions and the fingerprints of innocent data, information is transmitted to a server for analysis purposes.

In one embodiment, the security event may include cleaning the data, quarantining the data, and/or blocking the data. Further, if the data is successfully compared to the fingerprints of innocent data, it may be reported that the data is innocent.

In another embodiment, the information transmitted to the server may include the data itself. As an option, the information transmitted to the server may include a fingerprint (i.e. checksum) associated with the data.

In one aspect of the present embodiment, the fingerprint associated with the data may be compared with fingerprints associated with innocent data in a third database at the server. Further, the fingerprint associated with the data may be compared with fingerprints associated with virus definitions in a fourth database at the server.

It should be noted that the first database and the second database may both be components of a client computer coupled to the server via a network. Moreover, the third and fourth databases may be updated more frequently than the first and second databases.

In still another aspect of the present embodiment, the data may be transmitted to the server utilizing the network upon an unsuccessful comparison of the fingerprint associated with the data, and fingerprints in the third and fourth databases at the server. Once transmitted, the data may then be analyzed at the server. At least one of the databases may then be updated based on the analysis to improve future scanning.

From the perspective of the client, the data is initially compared with a plurality of virus definitions in a first database. A security event is executed if the data is successfully compared with at least one of the virus definitions. Thereafter, the data is compared with fingerprints of innocent data in a second database. If the data is successfully compared to the fingerprints of innocent data, the data is reported as innocent. Further, if the data is unsuccessfully compared to the virus definitions and the fingerprints of innocent data, the data may be transmitted to a server for analysis purposes.

From the perspective of the server, a fingerprint associated with data is received from a client computer for analysis purposes upon the data being unsuccessfully compared to virus definitions and fingerprints of innocent data stored on the client computers. Such fingerprint associated with the data is then compared with fingerprints associated with innocent data and virus definitions at the server. Next, the data is requested from the client computer utilizing the network upon an unsuccessful comparison of the fingerprint associated with the data and fingerprints associated with the innocent data and the virus definitions at the server. The data is then received for being analyzed. Either the virus definitions and/or the fingerprints of innocent data may then be updated based on the analysis to improve future scanning.

As yet another option, the first database and the fourth database may be utilized with the exclusion of the second database and the third database, or visa-versa.

DESCRIPTION OF THE PREFERRED EMBODIMENTS

Figure 1:
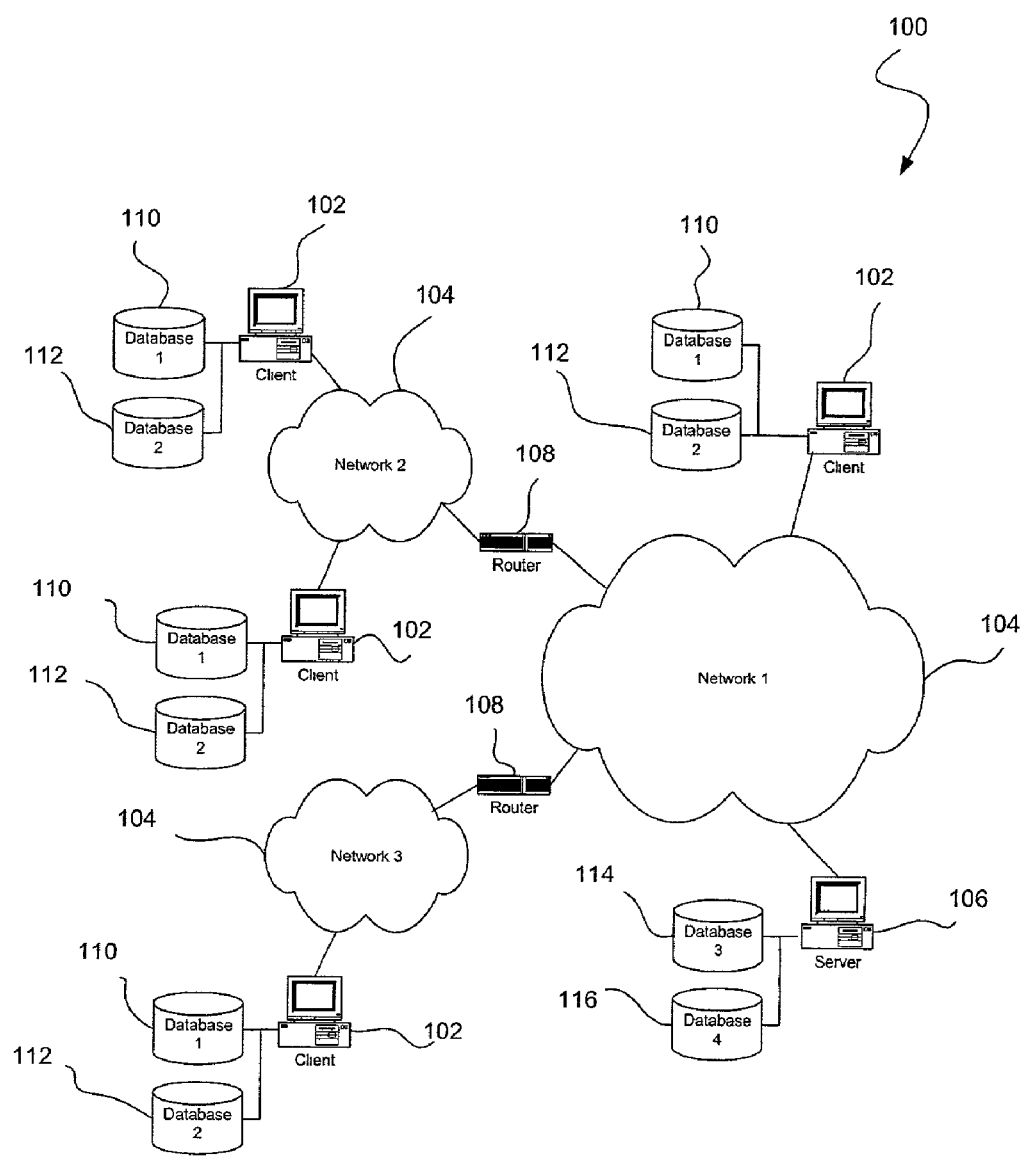
FIG. 1 illustrates a network architecture, in accordance with one embodiment.

FIG. 1 illustrates a network architecture 100, in accordance with one embodiment. As shown, a plurality of client computers 102 is provided which are coupled to a plurality of networks 104. Also included is at least one server computer 106 coupled to one of the networks 104. It should be noted that various other networks 104 may also be included each of which may be interconnected utilizing a plurality of routers 108.

In the context of the present network architecture 100, the networks 104 may each take any form including, but not limited to a local area network (LAN), a wide area network (WAN) such as the Internet, etc. Further, the client computers 102 may include a web server, desktop computer, lap-top computer, hand-held computer, printer or any other type of hardware/software.

Provided at each client computer 102 is a first database 110 including a plurality of virus definitions and a second database 112 including fingerprints of innocent data. At the server computer 106 is a third database 114 including fingerprints of innocent data and a fourth database 116 including virus definitions. Also included at each client computer 102 is a scanner (not shown) which is capable of conducting security scanning on the client computer 102 utilizing each of the databases in a manner that will soon become apparent.

As yet another option, the first database 110 and the fourth database 116 may be utilized with the exclusion of the second database 112 and the third database 114, or visa-versa.

Figure 2:
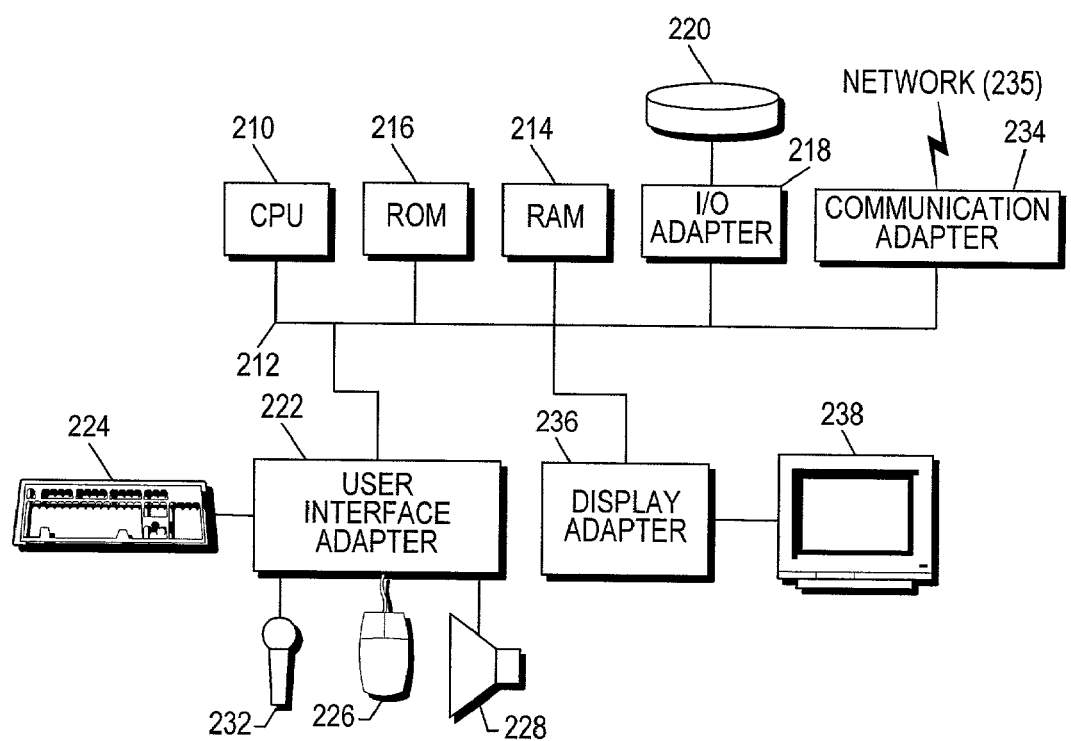
FIG. 2 shows a representative hardware environment that may be associated with the client computers and/or server computer of FIG. 1, in accordance with one embodiment.

FIG. 2 shows a representative hardware environment that may be associated with the client computers 102 and/or server computer 106 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
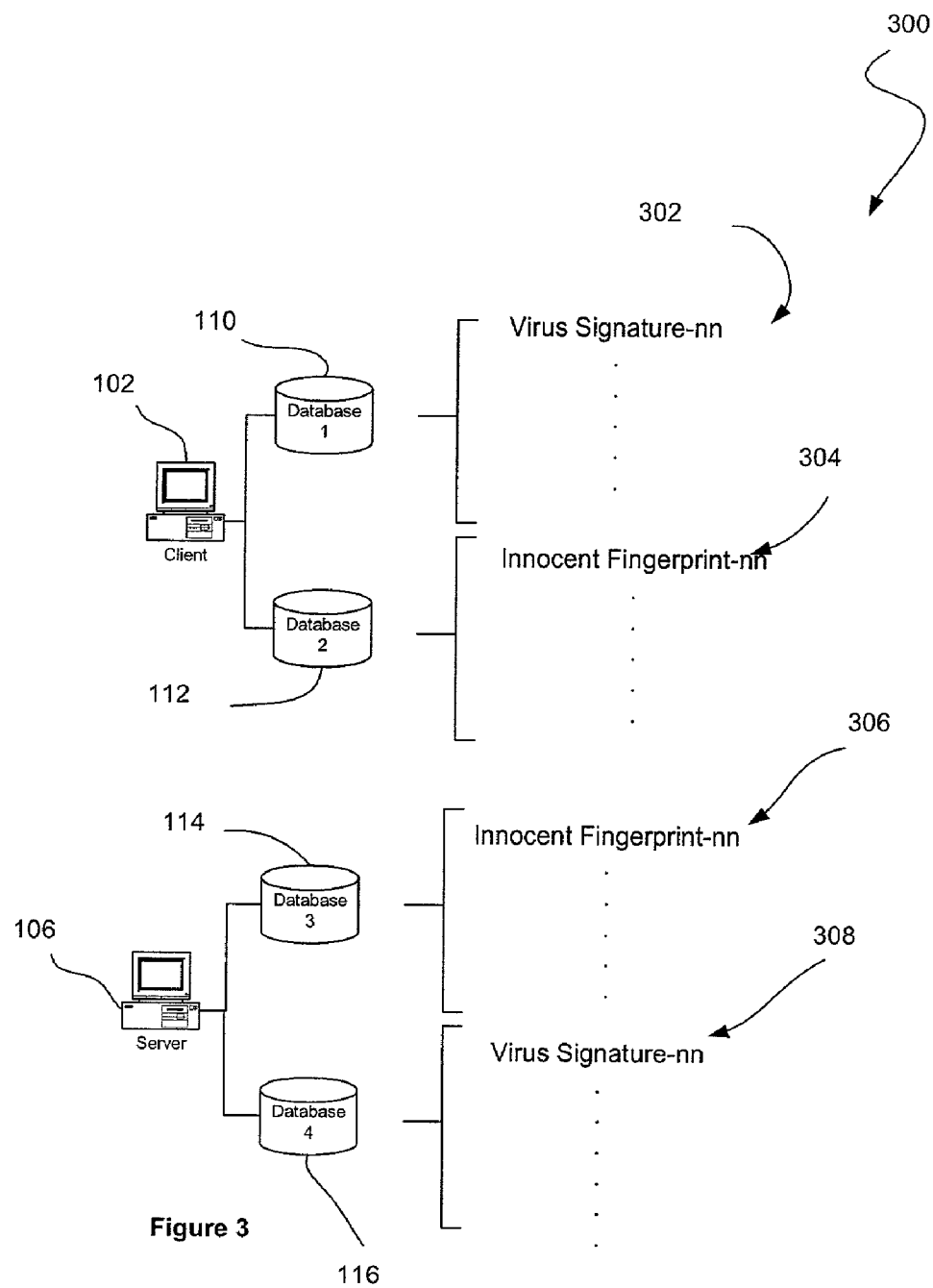
FIG. 3 is an illustration showing the contents of the various databases shown in FIG. 1.

FIG. 3 is an illustration showing the contents 300 of the various databases shown in FIG. 1. As shown, each client computer 102 includes a first database 110 having a plurality of virus definitions 302 stored therein. Also included is a second database 112 having fingerprints of innocent data 304.

It should be noted that the virus definitions 302 may include any version of or information on the virus definitions 302 (i.e. signatures, fingerprints, etc.) capable of identifying the virus definitions 302. In the context of the present description, the term "virus" is meant to include any malicious or unwanted code, content, etc. that may be harmful to a system. In a similar manner, the fingerprints of innocent data 304 may include any version of or information on the innocent data 304 (i.e. signatures, etc.) capable of identifying the fingerprints of innocent data 304. As will soon become apparent, the second database 112 serves to minimize the network traffic by avoiding uploading frequently-used innocent programs.

In the context of the present description, the fingerprint may include any information capable of identifying the data without including an entirety of the data. Further, the fingerprints may be calculated over the entirety of the data, or may only cover static parts of the data. As an option, multiple fingerprints may be generated for each piece of data. In such embodiments, each fingerprint may cover different areas. This is of particular use with files having variable areas.

At the server computer 106 is a third database 114 including fingerprints of innocent data 306 and a fourth database 116 including virus definitions 308. Similar to the databases of the client computer 102, the fingerprints of innocent data 306 and the virus definitions 308 may include any version of or information thereof (i.e. signatures, fingerprints, etc.) capable of identifying the fingerprints of innocent data 306 and the virus definitions 308, respectively.

Of course, the various databases may include more information on the data per the desires of the user.

In use, the network architecture 100 serves to maintain the fingerprints of innocent data 304 of the second database 112 at the client computers 102 consistent with the fingerprints of innocent data 306 of the third database 114 at the server computer 106. Moreover, the network architecture 100 serves to maintain the virus definitions 302 of the first database 110 at the client computers 102 consistent with the virus definitions 308 of the fourth database 116 at the server computer 106. This content is generated by the continuous analysis of data at the server computer 106. Further, a systematic updating scheme is provided to update the databases at the client computers 102, in a manner that will soon be set forth. To this end, the third and fourth databases 114 and 116 are capable of being updated more frequently and with greater efficiency than the first and second databases 110 and 112.

Figure 4:
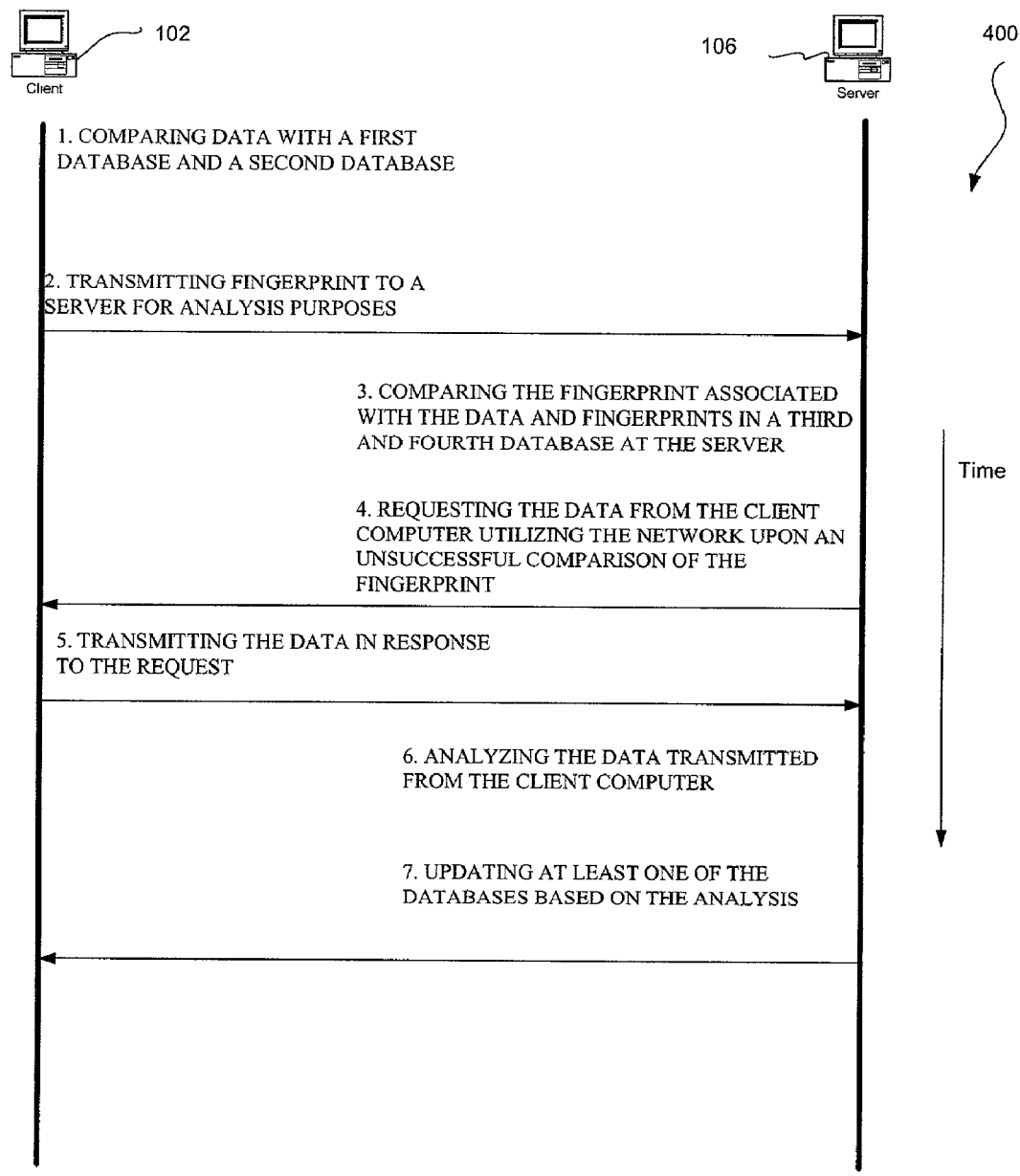
FIG. 4 is a flow diagram illustrating a general method for conducting a comprehensive search for malicious code in software, in accordance with one embodiment.

FIG. 4 is a flow diagram illustrating a general method 400 for conducting a comprehensive search for malicious code in software, in accordance with one embodiment. The method 400 may be initiated by a request to scan data for malicious code. Initially, in operation 1, data is compared with a plurality of virus definitions or the like in the first database 110 at the client computer 102. The data is then compared with fingerprints of innocent data or the like in the second database 112 at the client computer 102.

As will become apparent hereinafter, the client computer 102 may react accordingly upon the successful comparison of the data with at least one of the virus definitions or the fingerprints of innocent data. If, however, the data is unsuccessfully compared to the virus definitions and the fingerprints of innocent data, information is transmitted to the server computer 106 for analysis purposes. Note operation 2.

In one embodiment, the information transmitted to the server may include a fingerprint associated with the data. As mentioned earlier, the fingerprint may include any information capable of identifying the data without including an entirety of the data. In another embodiment, the information transmitted to the server may include at least a portion of the data itself. As yet a further option, the information transmitted to the server may include a checksum associated with the data.

In operation 3, the fingerprint associated with the data may be compared with fingerprints associated with innocent data in the third database 114 at the server computer 106. Still yet, the fingerprint associated with the data may be compared with fingerprints or signatures associated with virus definitions in the fourth database 116 at the server computer 106. The third and fourth databases 114 and 116 are more up-to-date than the first and second databases 110 and 112. As such, the comparison of operation 3 provides a more thorough comparison of the data, and identification thereof as either viral or innocent.

Upon an unsuccessful comparison of the fingerprint in operation 3, the data is requested by the server computer 106 utilizing the network, and transmitted by the client computer 102 in response to the request. Note operations 4 and 5. Once transmitted, the data may then be analyzed at the server computer 106. Note operation 6.

Based on the results of the analysis of operation 6, at least one of the databases may then be updated to reflect the new innocent or viral data. By continuously updating the databases in such a manner, future scanning is improved. More information regarding the operation of the client computer 102 and the server computer 106 will now be set forth in greater detail.

Figure 5:
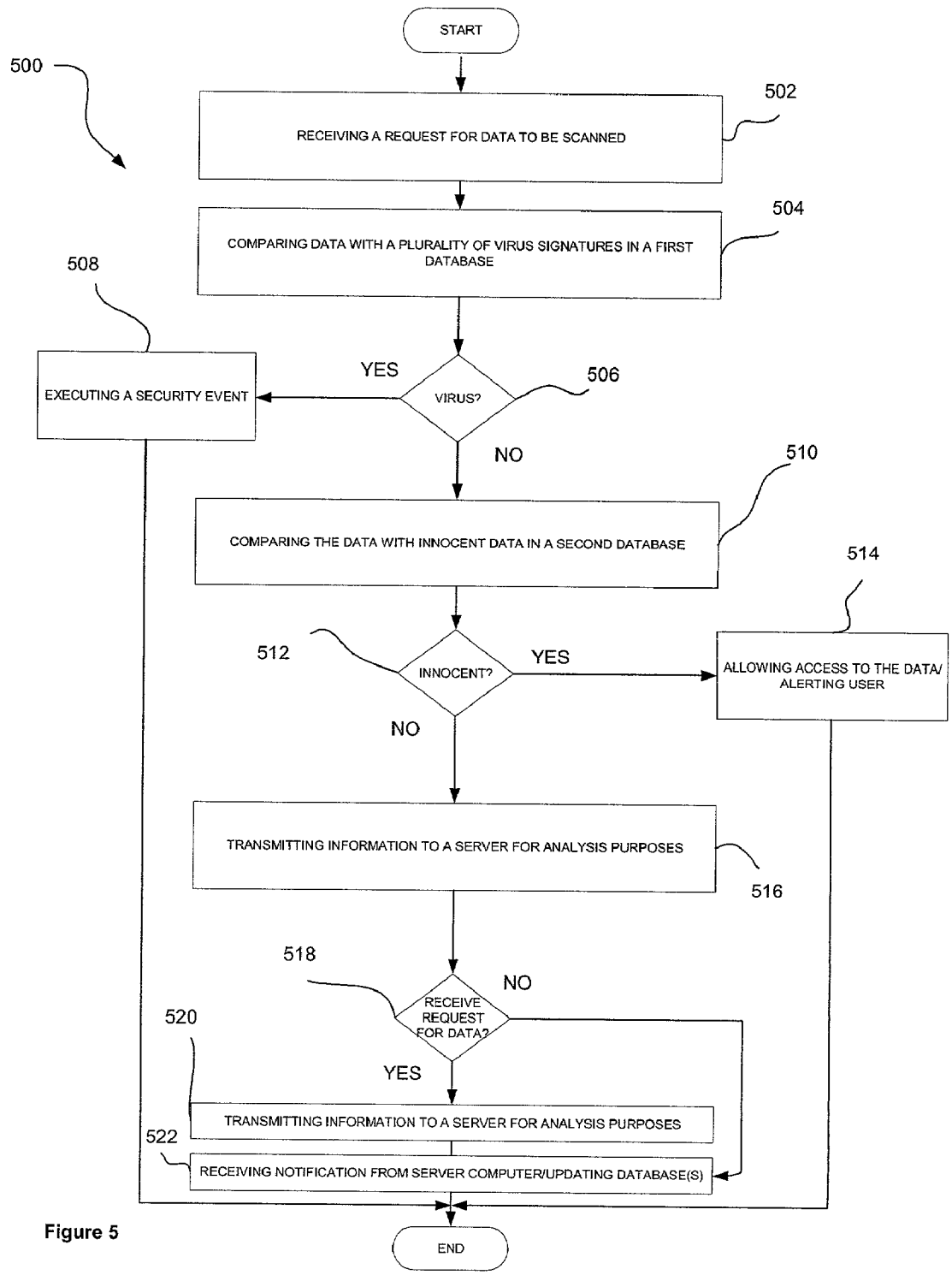
FIG. 5 shows a method of conducting a thorough scan at one of the client computers of FIG. 1.

FIG. 5 shows a method 500 of conducting a thorough scan at one of the client computers 102 of FIG. 1. In operation 502, a request for data to be scanned is received. Such request may be prompted by a request to access data in memory, the receipt of data via a network, a manual request, or any other situation.

The data is initially compared with virus definitions or the like in the first database 110. See operation 504. Based on decision 506, a security event is executed in operation 508 if the data is successfully compared with at least one of the virus definitions. In one embodiment, the security event may include cleaning the data, quarantining the data, blocking the data, or any action with the purpose of securing the associated client computer 102.

If a virus is not found in decision 506, the data is compared with fingerprints of innocent data in the second database 112. Note operation 510. If the data is successfully compared to the fingerprints of innocent data (see decision 512), the data is reported as innocent and/or the user may simply be allowed access to the data in operation 514. Such report may take the form of an alert or the like suitable to inform the user of the status of the data.

If the data is unsuccessfully compared to the virus definitions and the fingerprints of innocent data in decisions 506 and 512, respectively, information is transmitted to the server computer 106 for further analysis. As mentioned earlier, the information transmitted to the server may include a fingerprint associated with the data. Moreover, the fingerprint may include any information capable of identifying the data without including an entirety of the data. As an option, the fingerprint may be generated by the client computer 102 using a commonly known fingerprint generation algorithm. Of course, the fingerprint may already be available or retrieved from another source if desired. Moreover, the fingerprint may be an existing digital signature of the data.

As mentioned earlier in FIG. 4, the server computer 106 may request the data itself based on a comparison involving the fingerprint transmitted in operation 516. If such a request is received, as determined in decision 518, the client computers 102 are further adapted to transmit the data itself to the server computer 106. Note operation 520. As an option, such transmitted data may be encrypted and/or authenticated for security purposes.

In any case, in operation 522, the client computers 102 are notified by the server computer 106 in a manner that will be set forth hereafter. In response thereto, the fingerprint transmitted in operation 520 may be placed in either the first database 110 or the second database 112 for updating purposes.

Figure 6:
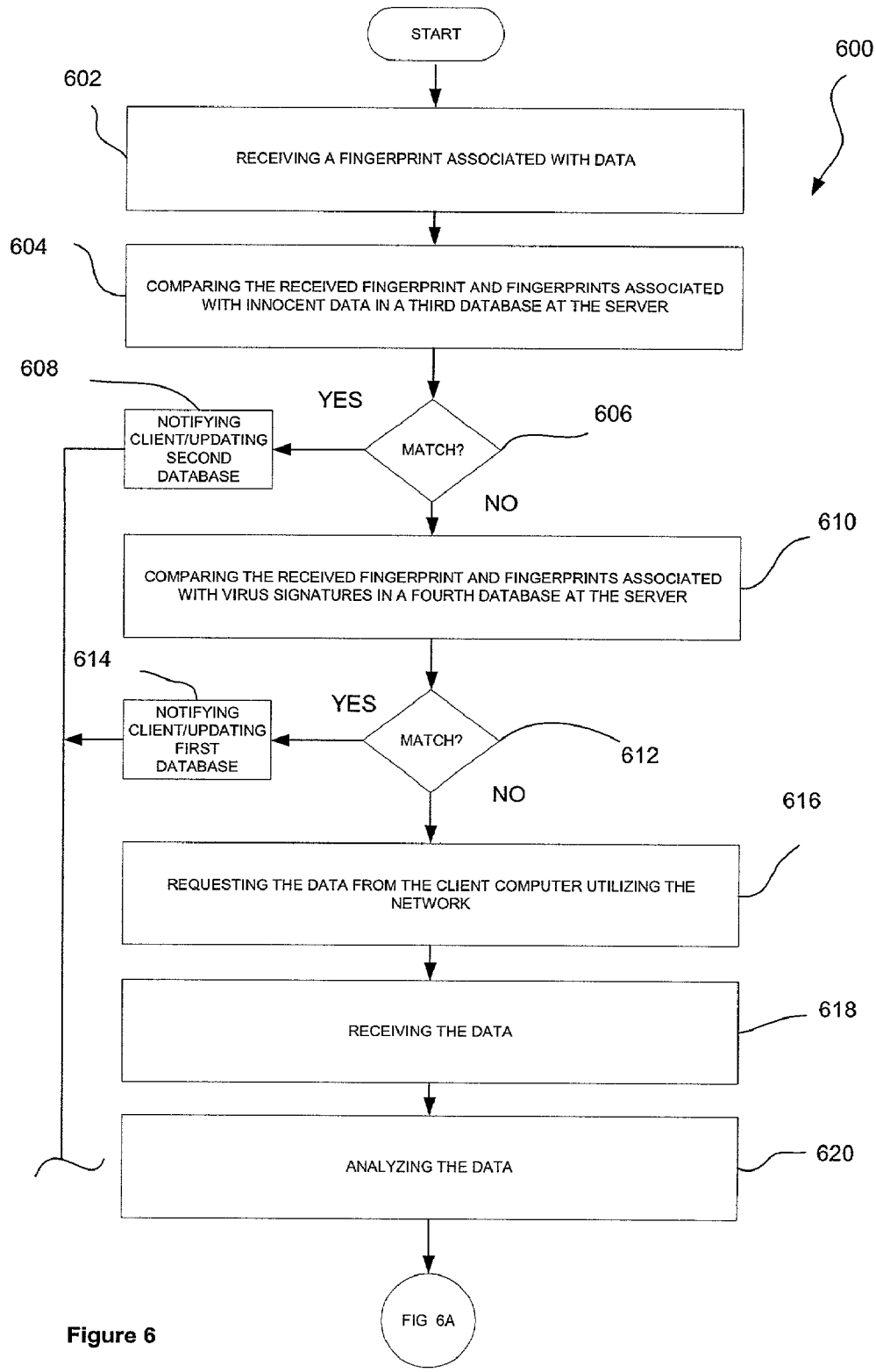
FIGS. 6 and 6A illustrate a method of conducting a thorough scan from the perspective of the server computer of FIG. 1.
Figure 6A:
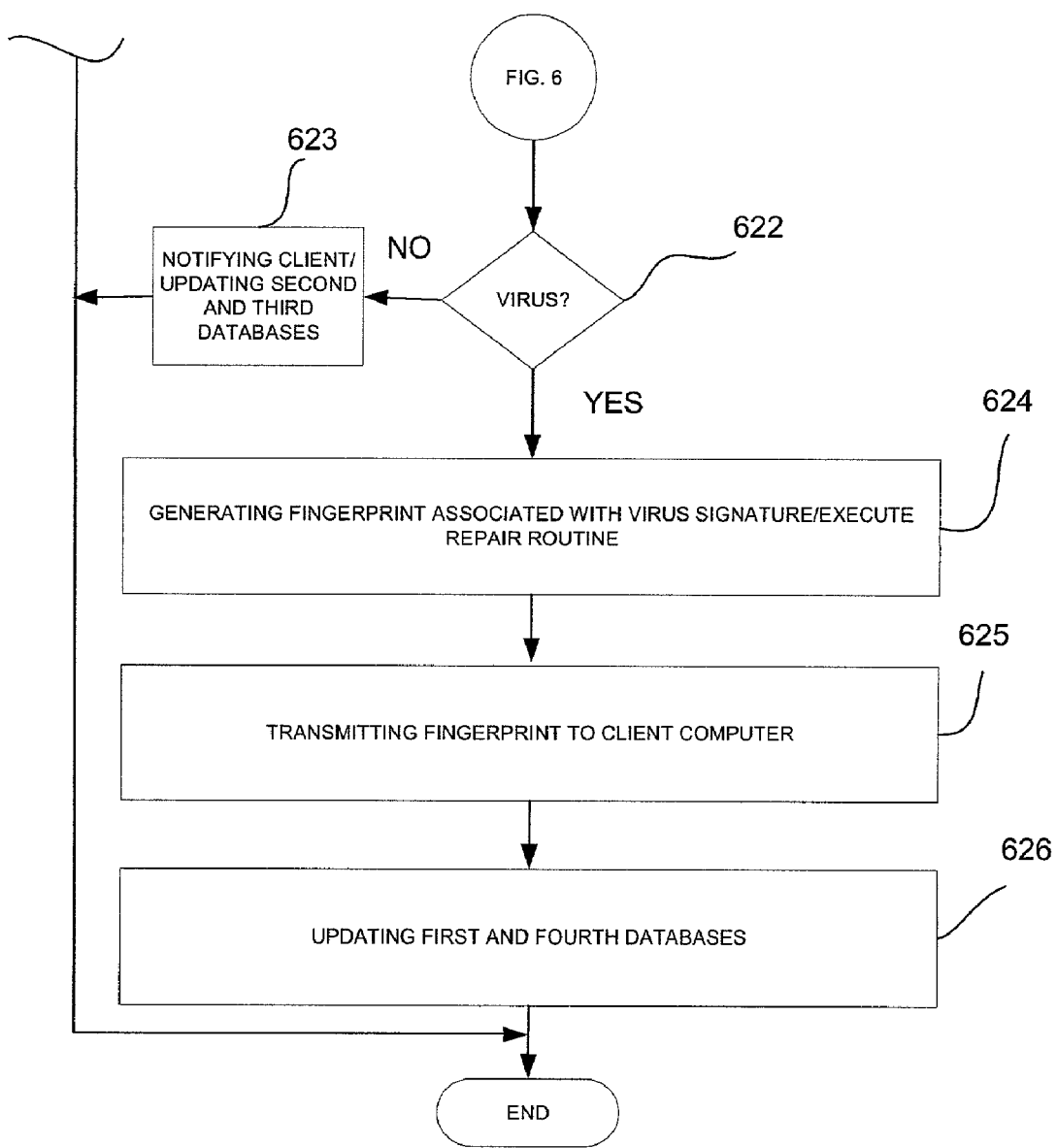

FIGS. 6 and 6A illustrate a method 600 of conducting a thorough scan from the perspective of the server computer 106 of FIG. 1. Initially, a fingerprint associated with the data is received from the client computer 102 for analysis purposes in operation 602. As mentioned earlier, such fingerprint is transmitted from the client computer 102 upon the associated data being unsuccessfully compared to virus definitions and fingerprints of innocent data stored on the client computers 102 in operations 504 and 510 of FIG. 5.

Such fingerprint associated with the data is then compared with fingerprints associated with innocent data in the third database 114 at the server computer 106. See operation 604. If a match is found as determined by decision 606, the appropriate client computer 102 is notified of the match in operation 608. Such notification may indicate that the data at issue is innocent. Further, the second database 112 at the client computer 102 is updated to reflect all of the fingerprints of innocent data (or at least the fingerprints of innocent data at issue) present in the third database 114 at the server computer 106. This may be accomplished by storing the fingerprint and/or the associated data already present at the client computer 102 in the second database 112.

Next, the fingerprint associated with the data is then compared with fingerprints associated with virus definitions in the fourth database 116 at the server computer 106. See operation 610. If a match is found as determined by decision 612, the appropriate client computer 102 is notified of the match in operation 614. Such notification may indicate that the data at issue is malicious. Moreover, the first database 110 at the client computer 102 is updated to reflect all of the virus definitions (or at least the virus definition at issue) present in the fourth database 116 at the server computer 106. This may be accomplished by storing the fingerprint and/or the associated data already present at the client computer 102 in the first database 110.

It should be noted that the fingerprints in the third and fourth databases 114 and 116 may be generated using the algorithm that is used by the client computers 102 for consistency purposes.

If a match is not made in either decision 606 or 612, the data itself is requested from the client computer 102 utilizing the network. See operation 616. By first comparing the fingerprints before requesting the data itself, bandwidth is conserved and efficiency is optimized. The data transmitted from the client computer is then received in operation 618 for being analyzed in operation 620. Such analysis may take the form of any well known virus detection algorithm for detecting viruses which refers to any type of malicious code. Per the desires of the user, the virus discriminator may produce decisions automatically or manually.

With reference now to FIG. 6A, if a virus is not found in operation 620 (see decision 622), the client is notified of the innocence of the data at issue so that the associated fingerprint and/or the associated data may be included in the second database 112 at the client computer 102 to update the same. Note operation 623. As mentioned earlier, this may be accomplished by storing the fingerprint and/or the associated data already present at the client computer 102 in the second database 112. During operation 623, the third database 114 is also updated by storing the fingerprint and/or the associated data therein.

If, on the other hand, a virus is found in operation 620, a fingerprint associated with the virus definition is generated using any well known algorithm and the data is repaired utilizing a well known repair method. Note operation 624. Next, in operation 625, the fingerprint generated in operation 624 is transmitted to the appropriate client computer 102. As such, the first database 110 at the client computer 102 may be updated to reflect the new virus definition in operation 626. Also during operation 626, the fourth database 116 is updated by storing the newly generated fingerprint therein.

It should be noted that the update operations 608, 614, 623 and 626 may be carried out for any number of the client computers 102. This may be accomplished by sending the appropriate fingerprint to the desired client computers 102 along with an indication as to which of the first and second database it is to be stored.

Still yet, a periodic update may also be employed to maintain the virus definitions 302 of the first database 110 at the client computers 102 consistent with the virus definitions 308 of the fourth database 116 at the server computer 106, and further to maintain the fingerprints of innocent data 304 of the second database 112 at the client computers 102 consistent with the fingerprints of innocent data 306 of the third database 114 at the server computer 106.

In still another embodiment, each client computer 102 may be updated by other client computers 102 in a shared environment of networked computers which function as a "server." Further, the various networks 104 described herein may include wireless networks. As yet a further option, spoofing may be monitored using anti-stealth measures.

The dialogue between the client 102 and server 106 need not be limited to an exchange of one set of requests/fingerprints. Multiple requests and multiple transmissions may be made. This includes a stage when the analyzed data is transferred. In such case, the data can be transmitted in parts as necessary following requests from the server 106.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for detecting viruses in software, comprising:
    (a) comparing subject data with a plurality of virus definitions in a first database;
    (b) executing a security event if the subject data is successfully compared with at least one of the virus definitions;
    (c) comparing the subject data with fingerprints of innocent data in a second database;
    (d) allowing access to the subject data if the subject data is successfully compared to the fingerprints of innocent data;
    (e) transmitting information to a server for analysis purposes if the subject data is unsuccessfully compared to the virus definitions and the fingerprints of innocent data, wherein the information transmitted to the server includes a fingerprint associated with the subject data;
    (f) comparing the fingerprint associated with the subject data and fingerprints associated with innocent data in a third database at the server;
    (g) comparing the fingerprint associated with the subject data and fingerprints associated with virus definitions in a fourth database at the server; and
    (h) transmitting the subject data to the server utilizing a network upon an unsuccessful comparison of the fingerprint associated with the subject data and fingerprints associated with the innocent data in the third database and the virus definitions in the fourth database at the server;

wherein the analysis utilizes a virus detection algorithm to detect whether the subject data is malicious or innocent.

2. The method as recited in claim 1, wherein the security event is selected from the group consisting of cleaning the subject data, quarantining the subject data, and blocking the subject data.

3. The method as recited in claim 1, and further comprising reporting that the subject data is innocent if the subject data is successfully compared to the fingerprints of innocent data.

4. The method as recited in claim 1, wherein the third and fourth databases are updated more frequently than the first and second databases.

5. The method as recited in claim 1, and further comprising analyzing the subject data transmitted to the server.

6. The method as recited in claim 1, wherein the subject data is transmitted to the server in separate parts.

7. The method as recited in claim 5, and further comprising updating at least one of the first database, the second database, the third database, and the fourth database based on the analysis.

8. The method as recited in claim 1, wherein the information is transmitted to the server via the Internet.

9. The method as recited in claim 1, wherein the first database and the second database are both components of a client computer coupled to the server via a network.

10. A computer program product for detecting viruses in software, comprising:
    (a) computer code for comparing subject data with a plurality of virus definitions in a first database;
    (b) computer code for executing a security event if the subject data is successfully compared with at least one of the virus definitions;
    (c) computer code for comparing the subject data with fingerprints of innocent data in a second database;
    (d) computer code for allowing access to the subject data if the subject data is successfully compared to the fingerprints of innocent data;
    (e) computer code for transmitting information to a server for analysis purposes if the subject data is unsuccessfully compared to the virus definitions and the fingerprints of innocent data, wherein the information transmitted to the server includes a fingerprint associated with the subject data;

(f) computer code for comparing the fingerprint associated with the subject data and fingerprints associated with innocent data in a third database at the server;
(g) computer code for comparing the fingerprint associated with the subject data and fingerprints associated with virus definitions in a fourth database at the server; and
(h) computer code for transmitting the subject data to the server utilizing a network upon an unsuccessful comparison of the fingerprint associated with the subject data and fingerprints associated with the innocent data in the third database and the virus definitions in the fourth database at the server;
  wherein the analysis utilizes a virus detection algorithm to detect whether the subject data is malicious or innocent.

11. The computer program product as recited in claim 10, wherein the security event is selected from the group consisting of cleaning the subject data, quarantining the subject data, and blocking the subject data.

12. The computer program product as recited in claim 10, and further comprising computer code for reporting that the subject data is innocent if the subject data is successfully compared to the fingerprints of innocent data.

13. The computer program product as recited in claim 10, wherein the third and fourth databases are updated more frequently than the first and second databases.

14. The computer program product as recited in claim 10, and further comprising computer code for analyzing the subject data transmitted to the server.

15. The computer program product as recited in claim 14, wherein the subject data is transmitted to the server in separate parts.

16. The computer program product as recited in claim 14, and further comprising computer code for updating at least one of the first database, the second database, the third database, and the fourth database based on the analysis.

17. The computer program product as recited in claim 10, wherein the information is transmitted to the server via the Internet.

18. The computer program product as recited in claim 10, wherein the first database and the second database are both components of a client computer coupled to the server via a network.

19. A system for detecting viruses in software, comprising:
  (a) logic for comparing subject data with a plurality of virus definitions in a first database;
  (b) logic for executing a security event if the subject data is successfully compared with at least one of the virus definitions;
  (c) logic for comparing the subject data with fingerprints of innocent data in a second database;
  (d) logic for allowing access to the subject data if the subject data is successfully compared to the fingerprints of innocent data;
  (e) logic for transmitting information to a server for analysis purposes if the subject data is unsuccessfully compared to the virus definitions and the fingerprints of innocent data, wherein the transmitted information includes a fingerprint associated with the subject data;
  logic for comparing the fingerprint associated with the subject data and fingerprints associated with innocent data in a third database;
  (g) logic for comparing the fingerprint associated with the subject data and fingerprints associated with virus definitions in a fourth database; and
  (h) logic for transmitting the subject data to the server utilizing a network upon an unsuccessful comparison of the fingerprint associated with the subject data and fingerprints associated with the innocent data in the third database and the virus definitions in the fourth database;
    wherein the analysis utilizes a virus detection algorithm to detect whether the subject data is malicious or innocent.

20. A method for detecting viruses in software, comprising:
  (a) comparing subject data with a plurality of virus definitions in a first database;
  (b) executing a security event if the subject data is successfully compared with at least one of the virus definitions;
  (c) comparing the subject data with fingerprints of innocent data in a second database;
  (d) reporting that the subject data is innocent if the subject data is successfully compared to the fingerprints of innocent data; and
  (e) transmitting a fingerprint of the subject data over a network to a server for analysis purposes if the subject data is unsuccessfully compared to the virus definitions and the fingerprints of innocent data;
  (f) comparing the fingerprint associated with the subject data and fingerprints associated with innocent data in a third database;
  (g) comparing the fingerprint associated with the subject data and fingerprints associated with virus definitions in a fourth database; and
  (h) transmitting the subject data to the server utilizing a network upon an unsuccessful comparison of the fingerprint associated with the subject data and fingerprints associated with the innocent data in the third database and the virus definitions in the fourth database;
    wherein the analysis utilizes a virus detection algorithm to detect whether the subject data is malicious or innocent.

21. A method for detecting viruses in software, comprising:
  (a) receiving a fingerprint associated with subject data from a client computer for analysis purposes upon the subject data being unsuccessfully compared to virus definitions and fingerprints of innocent data stored on the client computer;
  (b) comparing the fingerprint associated with the subject data and the fingerprints associated with innocent data at a server;
  (c) comparing the fingerprint associated with the subject data and fingerprints associated with virus definitions at the server;
  (d) requesting the subject data from the client computer utilizing a network upon an unsuccessful comparison of the fingerprint associated with the subject data, and the fingerprints associated with the innocent data and the virus definitions at the server;
  (e) receiving the subject data transmitted from the client computer in response to the request;
  (f) analyzing the subject data transmitted from the client computer; and
  (g) updating at least one of the virus definitions and the fingerprints of innocent data based on the analysis;
    wherein the analysis utilizes a virus detection algorithm to detect whether the subject data is malicious or innocent.

22. A method for detecting viruses in software, comprising:
   (a) receiving a fingerprint associated with subject data from a client computer for analysis purposes upon the subject data being unsuccessfully compared to virus definitions stored on the client computer;
   (b) comparing the fingerprint associated with the subject data and fingerprints associated with virus definitions at a server;
   (c) requesting the subject data from the client computer utilizing a network upon an unsuccessful comparison of the fingerprint associated with the subject data, and the fingerprints associated with the virus definitions at the server;
   (d) receiving the subject data transmitted from the client computer in response to the request;
   (e) analyzing the subject data transmitted from the client computer; and
   (f) updating the virus definitions based on the analysis; wherein the analysis utilizes a virus detection algorithm to detect whether the subject data is malicious or innocent.

23. A security method, comprising:
   (a) receiving a fingerprint associated with subject data from a client computer for analysis purposes upon the subject data being unsuccessfully compared to fingerprints associated with innocent data stored on the client computer;
   (b) comparing the fingerprint associated with the subject data, and fingerprints associated with innocent data at a server;
   (c) requesting the subject data from the client computer utilizing a network upon an unsuccessful comparison of the fingerprint associated with the subject data, and the fingerprints associated with the innocent data at the server;
   (d) receiving the subject data transmitted from the client computer in response to the request;
   (e) analyzing the subject data transmitted from the client computer; and
   (f) updating the fingerprints associated with the innocent data based on the analysis; wherein the analysis utilizes a virus detection algorithm to detect whether the subject data is malicious or innocent.

* * * * *